Aug. 11, 1936.  H. ARMSTRONG ET AL  2,050,551
ILLUMINATED DISPLAY APPARATUS
Filed April 1, 1935   6 Sheets-Sheet 1

INVENTORS.
HENRY ARMSTRONG.
CLIFFORD N. DUNTON.
By Stone, Boyden & Mack
ATTORNEYS.

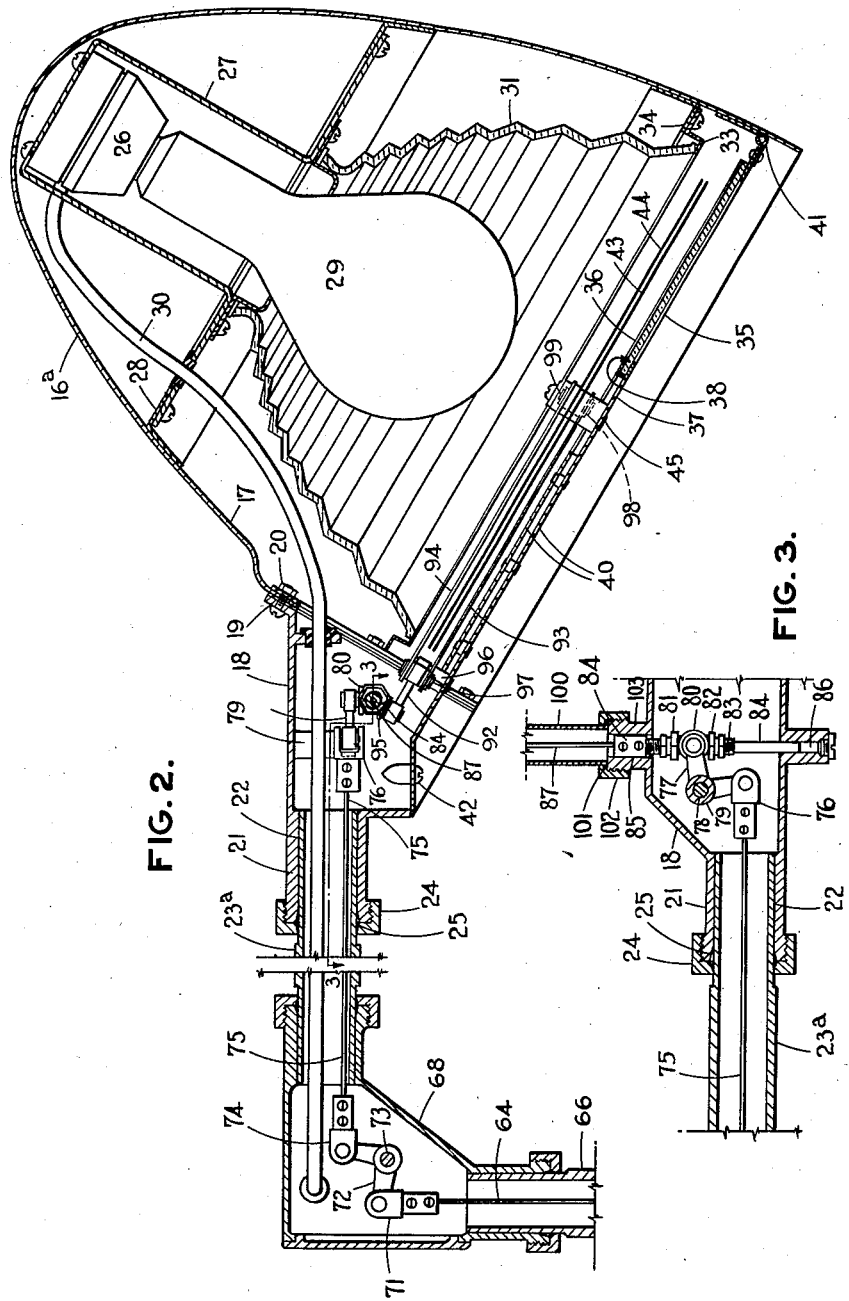

INVENTORS.
HENRY ARMSTRONG.
CLIFFORD N. DUNTON.
ATTORNEYS.

Aug. 11, 1936.  H. ARMSTRONG ET AL  2,050,551
ILLUMINATED DISPLAY APPARATUS
Filed April 1, 1935    6 Sheets-Sheet 4
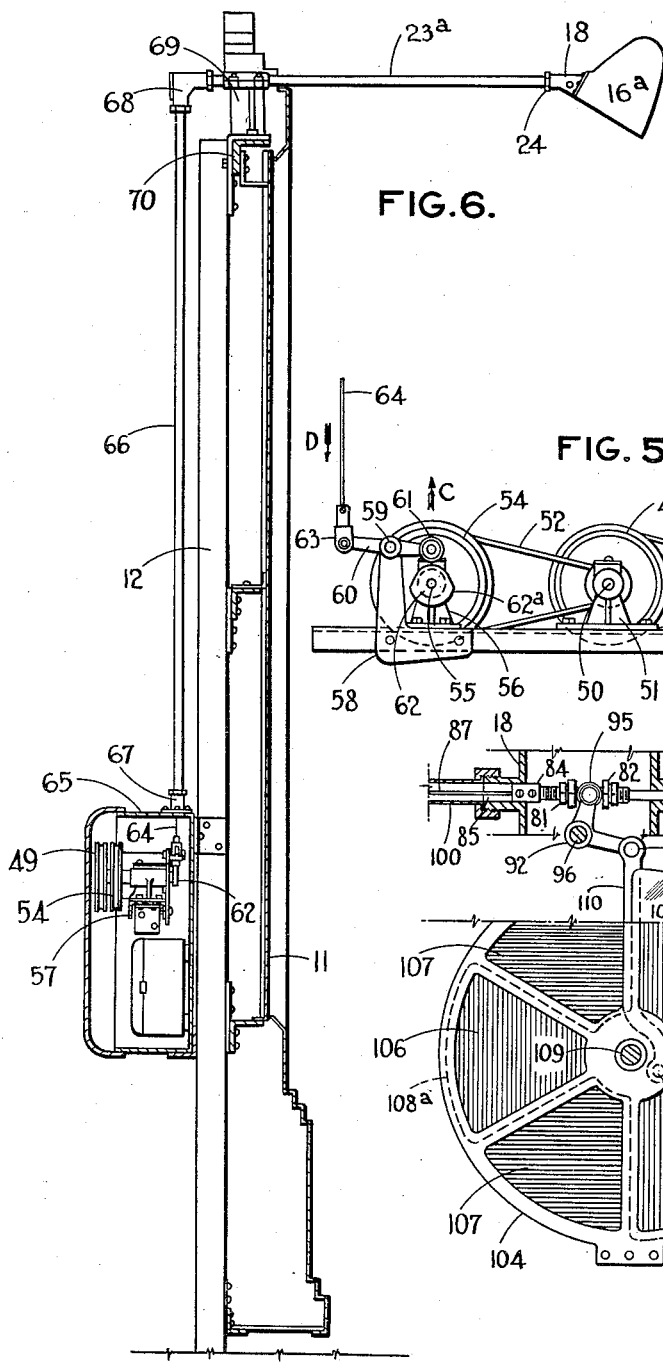
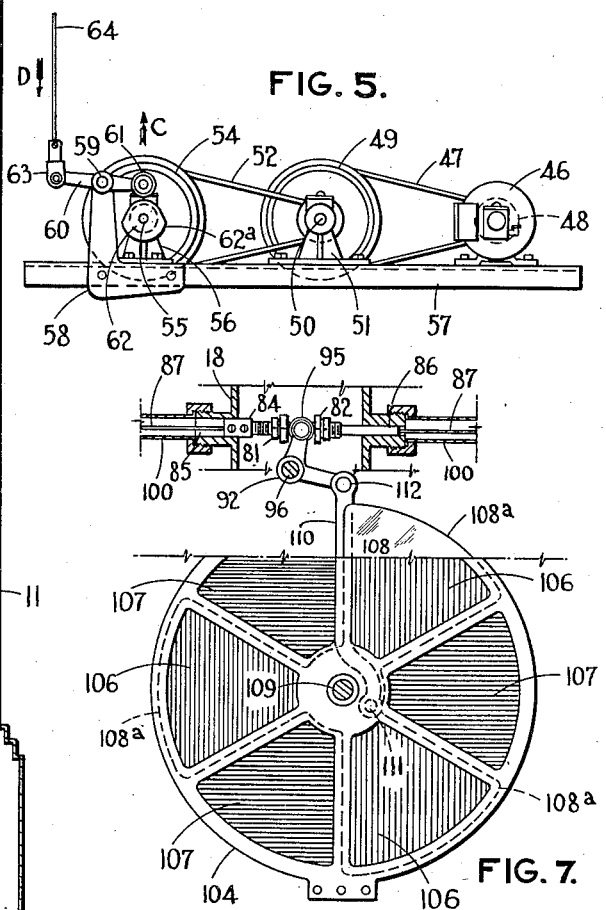
FIG. 6.
FIG. 5.
FIG. 7.
INVENTORS.
HENRY ARMSTRONG,
CLIFFORD N. DUNTON.
By Stone, Boyden & Mack
ATTORNEYS.

Aug. 11, 1936.        H. ARMSTRONG ET AL        2,050,551
            ILLUMINATED DISPLAY APPARATUS
            Filed April 1, 1935        6 Sheets—Sheet 5
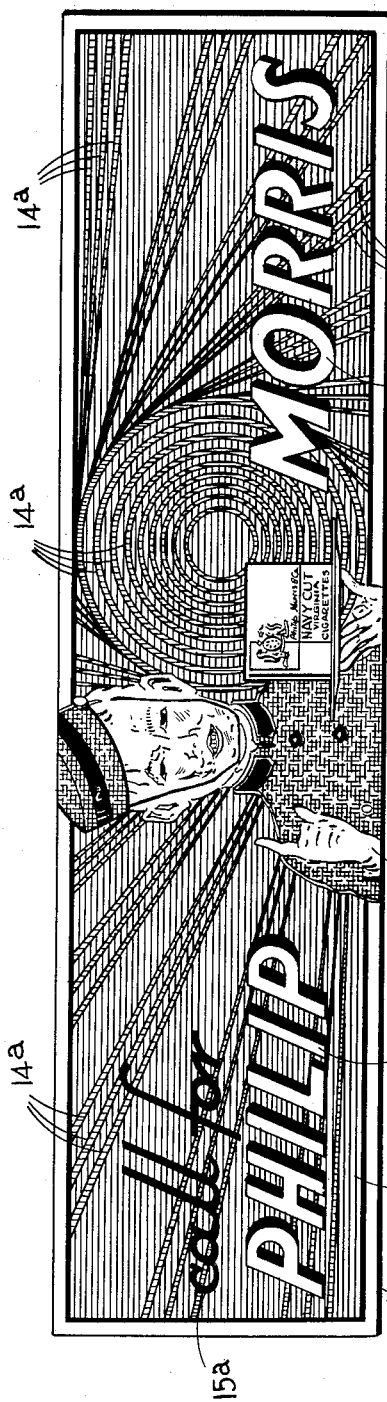
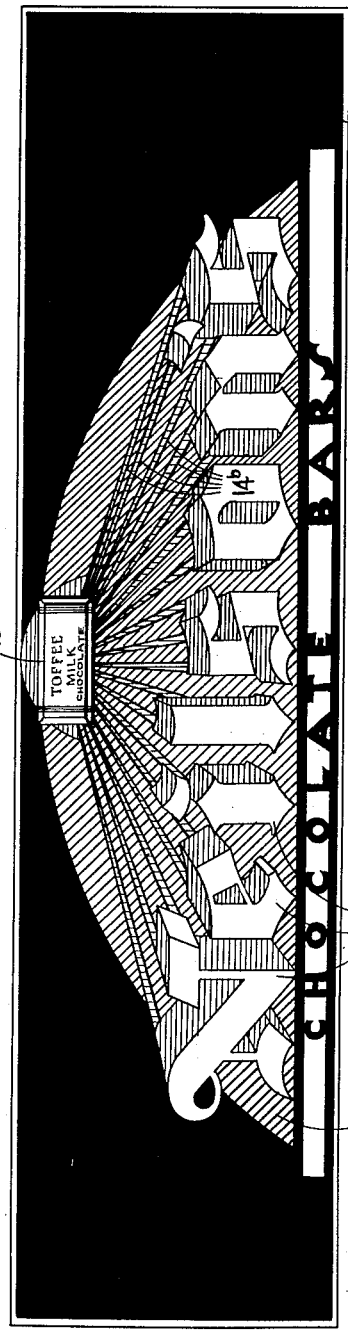
INVENTORS·
HENRY ARMSTRONG.
CLIFFORD N. DUNTON.
ATTORNEYS Aug. 11, 1936.  H. ARMSTRONG ET AL  2,050,551
ILLUMINATED DISPLAY APPARATUS
Filed April 1, 1935  6 Sheets-Sheet 6

INVENTORS.
HENRY ARMSTRONG.
CLIFFORD N. DUNTON.
ATTORNEYS.

Patented Aug. 11, 1936

2,050,551

UNITED STATES PATENT OFFICE 2,050,551

ILLUMINATED DISPLAY APPARATUS

Henry Armstrong, Montreal, Quebec, and Clifford N. Dunton, Toronto, Ontario, Canada, assignors to Vibra-Lite Limited, Montreal, Quebec, Canada, a corporation Application April 1, 1935, Serial No. 14,180

10 Claims. (Cl. 40—130)

The present invention has to do with the art of illuminated displays intended to be used for advertising, educational, amusement or other purposes. It has particular reference to an illuminated display in which portions to which it is desired to impart the appearance of animation and pulsating, vibrating, darting or throbbing movement, sometimes hereinafter termed "action denoting lines" and "action delineations" are formed in shades of non-neutral colour in contiguous relation with background portions formed in contrastingly different shades of non-neutral colour. The aforesaid display is intermittently illuminated with light of such spectral character and in such manner that the "action denoting lines" appear animated and appear to move rapidly, with or without directional effect, depending upon the form, size and arrangement of the action denoting lines.

Our invention appertains to illuminated displays of the aforementioned character and the novel aspects of the invention reside in the combination of illuminating apparatus with displays so designed and co-ordinated with the spectral characteristics of illumination by such apparatus that extraordinarily novel and attractive display effects are produced.

An object of the invention is to provide an illuminated display of the character set forth which, when viewed by an observer, affords the optical illusion of very pronounced "third dimensional effect", or in other words, certain portions of the display appear to reside in relatively different vertical planes.

In greater detail, the invention comprehends the provision of an illuminated display in which the appearance of animation is produced by varying the spectral characteristics of the light with which the display is flooded, and in which an exceptional appearance of dominance is imparted to the object representation desired to be featured.

The invention consists of the features and combinations of features as hereinbefore and hereinafter described and/or illustrated in the accompanying drawings together with all such equivalents therefor and modifications thereof as lie within the scope of the appended claims.

In the accompanying drawings which illustrate a number of many possible embodiments of the invention, but to the details of which the invention is not confined:—

Fig. 2 is a longitudinal vertical sectional elevation of one of the bulletin board illuminating units;

Fig. 3 is a fragmentary horizontal sectional elevation of part of the light transmission controlling shutter actuating means, the view being taken on the planes designated by line 3—3 appearing on Fig. 2;

Fig. 5 is an elevation, drawn at a smaller scale than Figs. 2, 3 and 4, showing part of the shutter powering means;

Fig. 6 is a vertical sectional view of the bulletin structure shown in Fig. 1, drawn at a larger scale than the former view, showing the co-relation of an illuminating unit and part of the shutter powering means;

Fig. 7 is a detail view, drawn to a smaller scale than Fig. 4, showing a modified form of shutter mechanism; and Figs. 8 to 11 inclusive are views representing various displays which depict novel characteristics of the invention.

Figure 1:
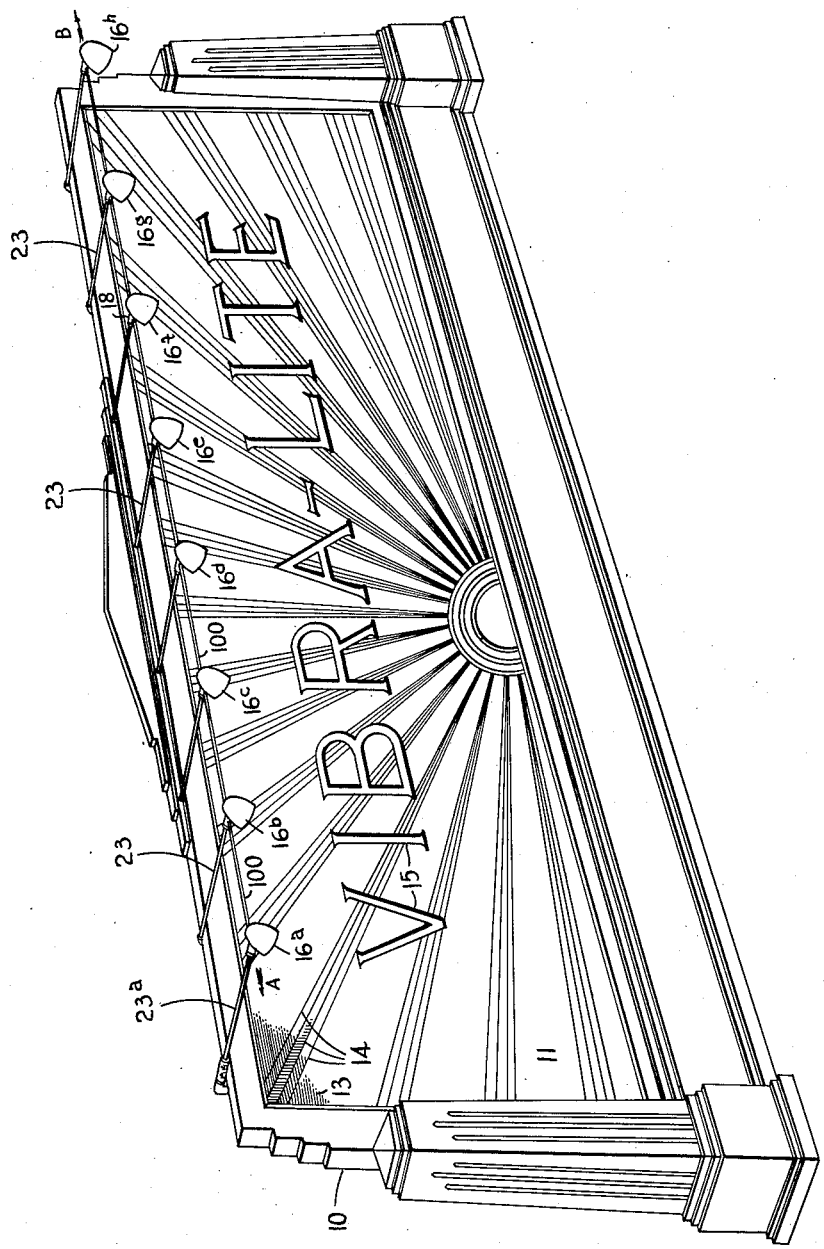
Fig. 1 is a perspective view of a bulletin board equipped with apparatus according to our present invention.

In the description which follows, reference is made to "display" and "display surface" and these terms are intended to cover any display or display surface of any character whatsoever upon which there is represented matter to be displayed and regardless of the character of the matter.

By the term "indicia figure"; "object representation"; "scenic object" and such like, we mean letters, figures, arbitrary designs or pictorial representations of objects or parts of objects, to which the attention of an observer is to be particularly directed by the "action denoting lines" or "action delineations". By the latter terms we mean pictorial representations of motion, speed or action, or delineations which when illuminated appear to move and so attract the attention of an observer. The term "background" is intended to designate a portion or portions of the display other than pictorial representations of objects or parts of objects, and the "action denoting lines" or "action delineations".

Referring now to the drawings in detail, the numeral 10 designates an illuminated display in the form of a bulletin structure. A very brief description of the bulletin structure shown will suffice, since the particular type of "display" is immaterial to the invention which has a wide range of applicability to various kinds of display devices, irrespective of the particular form illustrated. The bulletin structure depicted includes a display surface 11 and a supporting frame structure generally designated by the reference numeral 12. The display surface 11 which has been illustrated for explanatory purposes is an advertising sign including a background or background portions 13; action denoting lines or action delineations 14 which, when illuminated intermittently and in rapidly recurring cycles, appear animated; and pictorial representations of objects, generally designated by the numeral 15.

For the purposes of this invention it is desirable that the action denoting lines or action delineations desired to be animated be coloured in shades of non-neutral colour, the predominating hue of which is deficient or absent in the colour of the immediately adjacent background areas and that the background areas immediately adjacent the action denoting lines or animated action delineations be coloured in shades of colour preferably non-neutral, the predominating hue of which is deficient or absent in the colour of the action denoting lines or animated action delineations.

In order to more clearly define the peculiar characteristics of the displays and the novel effects obtained through illumination according to the present invention, a detail description of the illuminating apparatus is now entered into.

Illuminating apparatus

A plurality of illuminating units designated by the reference characters 16a, 16b, 16c, 16d, 16e, 16f, 16g, and 16h are arranged forward of the front of the bulletin structure, and in a horizontal plane at a slightly higher elevation than the top of the display surface 11. The said units are arranged in equidistant horizontal spaced relation so as to effect substantially uniform illumination of the said display surface.

Each said illuminating unit comprises a housing 17, preferably in the form of a deep drawn metal shell, to which is tightly secured a casting 18, by screws 19 and nuts 20. The said casting includes a sleeve 21 which is internally machined to receive the machined end 22 of the supporting pipe 23. The casting 18 is secured to the said pipe by the draw nut 24 and compression ring 25. Within the housing is mounted a lamp socket 26 on the frame 27, which in turn is fastened to the ring member 28, the latter being spot-welded to the housing 17. A lamp 29 is supported by the said socket, and 30 designates electric circuit wires leading to the latter from circuit mains, not shown. A reflector 31 is arranged circumjacent to the lamp 29 and is supported by the member 32, which is fastened to the member 27, and the member 33 which is fastened to the brackets 34, one only of which is shown, the same being welded to the housing 17. The reflector illustrated is preferably formed of glass and is surfaced externally with silver. Its function is to reflect light emitted from the lamps 29 against the colour filter generally designated by the numeral 35.

The colour filter of each said illuminating unit includes metal frame sections 36 and 37, between which are secured sections of colouring media, for example glass. According to the present adaptation of the invention, each said illuminating unit is designed to flood the display surface 11 continuously with light of a colour deficient in the distinguishing hue of the indicia, for example with blue or green light, and intermittently with light of a colour deficient in the distinguishing hue of the background and preferably corresponding in colour with the colour of the indicia, for example red. Accordingly, a plurality of sections 38 of the colour filter 35 are blue or green and of such hue as to transmit blue or green light, and sections 39, one arranged at each side of each section 38, are red and of such hue as to transmit red light. Between each two immediately adjacent sections of red media 39 is arranged a portion of opaque material 40, herein shown as part of the metal frame sections 36 and 37. The contrastingly coloured filter sections 38 and 39 are arranged as illustrated to effect substantially uniform distribution of coloured light over the entire display surface 11 of the bulletin structure 10. The colour filter 35 in its entirety is articulated by the hinge 41, fastened thereto and to the housing 17, and is secured at the opposite side thereof to the casting 18 by screws, one of which is shown at 42. Upon removal of the said screws, the colour filter may be swung downwardly, about the hinge pintle, to gain access to the lamp 29, for replacement purposes.

Figure 4:
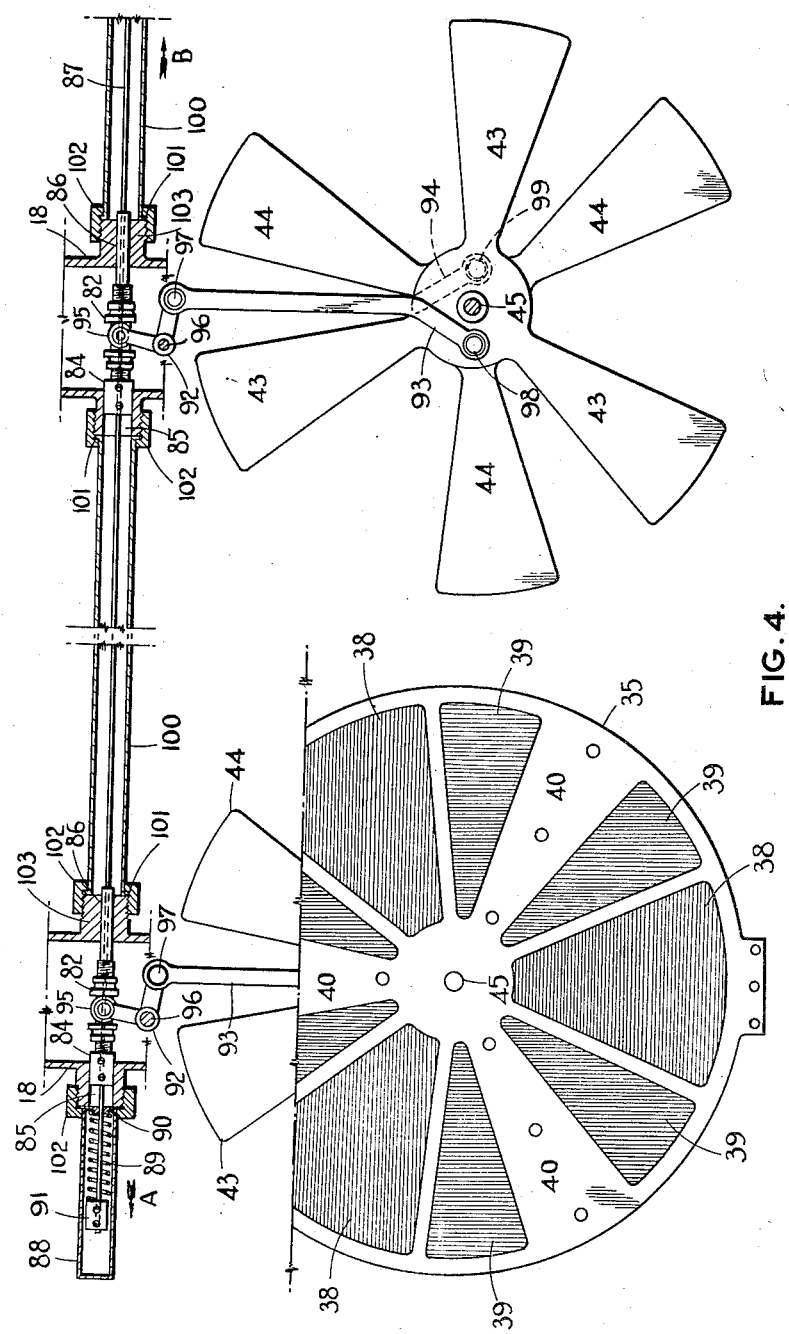
Fig. 4 is a detail view, partly in section and partly in elevation, showing the shutter mechanism of two of the illuminating units, and a portion of a colour filter in proper co-relation with respect to one shutter mechanism.

Between the lamp 29 and the colour filter 35 is arranged light transmission control means, adapted to govern passage of light emitted from the lamp 29 through the colour filter sections 39. The said means are preferably in the form of two movable shutters, indicated generally by the numerals 43 and 44. The said shutters are pivoted, close to one another, on the pivot pin 45 which is secured to the frame section 37 of the colour filter 35, substantially centrally thereof. Each shutter referred to includes three blades, adapted when positioned as shown in Fig. 4, to cover three of the six colour filter sections 39, so that both shutters, in the position shown, cover all of the colour filter sections 39 and prevent transmission of light, emitted from the lamp 29, therethrough. In such position, light emitted from the lamp 29 will filter through the blue sections 38 only.

As before premised, the shutters 43 and 44 function to govern transmission of red light from the colour filter in such wise that passage of red light is intermittently impeded. In the position shown in Fig. 4, passage of light through the filter sections 39 is impeded by the said shutters. To permit passage of light, the said shutters are so shifted that the blades thereof are positioned behind the opaque sections 40 of the colour filter frame, in which position they do not overlap the red colour filter sections 39.

Shifting of the shutters 43 and 44 to alternately cover and clear the sections 39 of the colour filter 35 is effected mechanically. The source of motive force for actuating the said shutters may be in the form of an electric motor, indicated at 46 in Fig. 5. A belt 47 is trained over the motor shaft pulley 48 and the pulley 49 mounted on the intermediate shaft 50, which in turn is journaled in the bearing unit 51. A second belt, indicated at 52 is trained over the pulley 53 mounted on the shaft 50 and the pulley 54 mounted on the cam shaft 55, the latter being journaled in the bearing unit 56. The said bearing units and the motor are mounted on the base channel 57, to which is attached the bracket 58. A pivot pin 59 is supported by the said bracket and a rocker arm 60 is mounted on the said pivot pin. A roller 61 is carried by one end of the said rocker arm, and bears against the periphery of the cam 62 mounted on the shaft 55. The contour of the said cam embodying the ridge 62a is such that upon rotation thereof, oscillating or rocking motion is imparted to the said rocker arm. A connecting yoke 63 is articulated to the rocker arm 60 and a motion transmitting flexible wire 64 is attached at one end thereof to the said connecting yoke.

The mechanism illustrated in Fig. 5 is arranged at the rear of the bulletin structure and is housed by the control box 65, the latter being supported upon the bulletin frame structure 13. The wire 64 extends from the connecting yoke 63 upwardly through the tubular member 66, which is secured at its lower end to the coupling 67 attached to the control box 65, and at its upper end to the casting 68 secured to the rear end of the pipe which supports the illuminating unit 16a located near the left end of the bulletin structure. In order to identify the said pipe from the other pipes designated at 23, it is indicated by the reference character 23a. Pipe 23a is supported by the bracket 69 mounted upon the upper stringer 70 of the bulletin frame structure 10.

Pipes 23 supporting the said illuminating units, other than the pipe immediately heretofore referred to, are supported by brackets, not shown, mounted upon the stringer 70, which brackets are equivalent from a functional viewpoint to the bracket 69, illustrated in Fig. 6.

Referring now to Figs. 2 and 3, the upper end of the wire 64 is connected to the connecting yoke 71, which in turn is articulated to one arm of the bellcrank 72 pivoted on the pin 73. The other arm of the bellcrank 72 is articulated to the connecting yoke 74, which is attached to one end of the motion transmitting flexible wire 75 which extends through the pipe 23a and is connected to the connecting yoke 76. The latter is articulated to one arm of the bellcrank 77 pivoted on the pin 78 extending from the boss 79 integral with the casting 18. The other arm of the bellcrank 77 carries a small roller 80 which is positioned between the adjustable nuts 81 and 82 engaging the threaded shank 83 of the guide pin 84, clearly shown in Fig. 3. The said guide pin is slidably supported in reamed apertures 85 and 86 in the casting 18 mounted on the pipe 23a, shown in Fig. 2.

Casting 18 of each said illuminating unit is formed similar to the aforementioned casting 18 mounted on the pipe 23a, and a guide pin 84, similar to that previously described, is slidably supported in each casting 18, in the manner described, and as shown in Fig. 4. A motion transmitting flexible wire 87 is connected at one end of the guide pin 84 shown in Figs. 2 and 3, extends from illuminating unit to illuminating unit, passes longitudinally through and is fastened to the guide pin 84 of each said unit. The casting 18 of the illuminating unit 16h located near the right end of the bulletin structure shown in Fig. 1 is connected with a tubular enclosure 88, within which is positioned a coil spring 89, one end of which bears against the retaining washer 90. The other end of the said coil spring abuts a collar 91 mounted near the end of the wire 87. The function of the said coil spring is to urge the said wire 87 in the direction of arrow A, appearing in Figs. 1 and 4, and the function of the mechanism including bellcrank 77, wire 75, bellcrank 72, wire 64, rocker arm 60, cam 62, and rotating means for the latter, is to alternately pull the wire 87 in the direction of arrow B, appearing in Figs. 1 and 4, thereby effecting compression of the said spring intermittently.

Motion is transmitted from the guide pin 84 to the shutters 43 and 44 of each illuminating unit by the bellcrank 92 and the links 93 and 94. A roller 95 is mounted on one arm of the said bellcrank and fits between the nuts 81 and 82 on the guide pin 84. The said bellcrank is pivoted on the pin 96 secured to the filter frame section 37, clearly shown in Fig. 2, and one arm of the said bellcrank is articulated to the links 93 and 94 by the pin 97. Link 93 is articulated to the shutter 43 by the pin 98, and the link 94 is articulated to the shutter 44 by the pin 99.

The illuminating units designated by the reference characters 16a to 16h inclusive, are retained in spaced relation by the tubular members 100. The ends 101 of the latter are flared outwardly and are engaged by the draw nuts 102 threaded onto the bosses 103 integral with the castings 18. The tubular members also serve as enclosures, for the shutter actuating wire 87 which extends longitudinally therethrough, as clearly shown in Fig. 4.

In Fig. 4 we have illustrated the shutter mechanism of the two illuminating units designated by the reference characters 16g and 16h, in order to clearly depict the co-relation of the wire 87 and associated shutter actuating means with respect to a plurality of illuminating units. In Fig. 4 the shutters 43 and 44 are shown in light impeding position, with the wire 87 retracted in the direction of arrow B, and the coil spring 89 under compression. For purpose of comparison, the associated shutter actuating mechanism is shown in Figs. 2, 3 and 5 in the position occupied thereby when the shutters 43 and 44 do not overlap the sections 39 of the colour filters 35.

It is to be understood that the lamps 29 of the respective illuminating units and the electric motor 46 may be arranged according to standard wiring practice in circuits connected to a source of current supply, and that the same may be governed by a time clock and other control instrumentalities according to established practice.

*Modified form of shutter mechanism*

In Fig. 7 we have shown a modified form of shutter mechanism for controlling passage of coloured light to the display surface 11. The numeral 104 designates a colour filter in its entirety, the same comprising a frame 105 arranged to support sections of colouring media 106 and 107, arranged in alternated arrangement. In this form of the invention, the sections 106 are preferably red and the sections 107 are preferably either green or blue, depending upon the subject matter of the display, so that light transmitted through the said sections of colouring media is red and green or blue, respectively. The shutter 108 consists of three blades 108a which are of a suitable proportion to cover all of either said groups of colouring media sections. The said shutter is pivoted on pivot pin 109 supported by the frame 105, in such wise that the said shutter may be oscillated to and fro, from one said group of colouring media sections to the other said groups of colouring media sections.

The means for actuating each shutter 108 is herein shown as the equivalent of the mechanism illustrated best in Fig. 4, except that a single link designated at 110 is articulated to each shutter as at 111 and to a bellcrank 92 as at 112. Since means for actuating the bellcranks 92 has been clearly described, further elucidation of such mechanism in conjunction with this modification appears to be unnecessary. It is to be understood however, that each of the illuminating units designated by the reference characters 16a to 16h inclusive may be equipped with the modified form of shutter mechanism described and actuated by the drive mechanism hereinbefore explained in detail, and as hereinafter more explicitly pointed out in the following analysis of operation.

Operation

Referring first to the preferred form of apparatus illustrated in Figs. 1 to 6 inclusive, let it be assumed for purposes of explanation that the lamps 29 and the electric motor 46 are electrically energized, the display surface 11 is constantly flooded with blue or green light, and is intermittently flooded with red light, by reason of actuation of the shutters 43 and 44.

Actuation of the shutters 43 and 44 of each illuminating unit is effected upon energization of the electric motor 46, from which torque is transmitted by the pulley 48, the belt 47, the shaft 50, the pulley 43, the belt 52, and the pulley 54 to the shaft 55, which effects rotation of the cam 62, and in turn movement of the rocker arm 60. Each time the shaft 55 revolves, the ridge 62a of the cam 62 forces the roller 61 on the rocker arm 60 upwardly, as indicated by the direction arrow C, and this action in turn pulls the wire 64 downwardly, as indicated by the direction arrow D. Wire 64 being interconnected with wire 87 through the components 71, 72, 74, 75, 76, 77, 80 and 84, upon movement as above refrred to, effects movement of the wire 87 in the direction of arrow B, and compression of the spring 89. Since the guide pin 84 of each illuminating unit is attached to the wire 87, all of the said guide pins are shifted simultaneously, with the result that all the bellcranks 92 are oscillated and the interconnected links 93 and 94 shift the shutters 43 and 44 of each illuminating unit so that the said shutters are positioned, when the roller 61 is in contact with the ridge 62a of the cam 62, as shown in Fig. 4. In this position, the red sections 39 of the colour filter are covered by the blades of the said shutters, and transmission of light from the lamps 29 through the said colour filter sections is impeded.

Continued rotation of the cam 62 causes the roller 61 to ride off the cam ridge 62a, with the result that the spring 89 is permitted to expand and shift the wire 87 in the direction of the arrow A. Such movement of the wire 87 effects simultaneous movement of all the guide pins 84, rocking of all the bellcranks 92, and movement of all the links 93 and 94, in such manner that the blades of the shutters are shifted into concealment behind the opaque sections 40 of the colour filters 35, in which position they clear the sections 39 thereof and light from the lamps 29 is now transmitted through the blue or green sections 38 and the red section 39 of the said colour filters.

From the above it is clear that upon one complete revolution of the cam 62, the shutters 43 and 44 are shifted from the position depicted in Fig. 4 into concealment behind the opaque sections 40 of the said colour filters, and are subsequently returned to the position illustrated by Fig. 4. It follows therefore that upon each revolution of the cam 62 red light is caused to be momentarily transmitted from the section 39 of the colour filter 35 to the display surface 11, and is subsequently cut off. In other words, during each revolution of the cam 62, there occurs a period of illumination of the display surface 11 with red light transmitted from the colour filter sections 39, followed by a period of non-illumination with light of the aforesaid colour.

Operation of modified form of shutter mechanism

Let it be assumed that the illuminating units designated by the reference characters 16a to 16h inclusive are equipped with colour filters and shutters of the type shown in Fig. 7 and that the shutters thereof are arranged for actuation by the motion transmitting wire 87 and associated powering means. Upon reciprocation of the said wire in the manner described, the bellcranks 92 are oscillated and motion is transmitted therefrom to the shutters 108 by the links 110, whereby the said shutters are oscillated about the pivot pin 109 and alternately shift from sections 106 to sections 107 of the colour filters 104, and vice versa. It follows therefore that light emanating from the lamps passes through the red sections 106 and the green or blue sections 107 of the colour filters in alternated order and that the display surface 11 is alternately flooded with red, and green or blue light.

Display surface effects

From the foregoing description it is apparent that the display surface 11 is flooded with contrastingly different shades of non-neutral coloured light and that the light of shades of colour substantially corresponding to the shades of colour of the action denoting lines, or action delineations, is caused to impinge the said display surface intermittently in rapidly recurring cycles whereby, the said action denoting lines, or action delineations, appear to be substantially constantly brilliantly illuminated. The display surface background 13 appears to be brilliantly illuminated with substantially non-flickering effect and the action denoting lines, or action delineations, designated by the reference characters 14, appear substantially constantly brilliantly illuminated and appear to have a pulsating, throbbing, darting, vibrating, fluttering, flickering, or waving movement, with or without the appearance of directional movement, the whole according to the shape and size of the action denoting lines, or action delineations, and to the frequency of recurrence of illumination of the display surface 11 with red light.

In Fig. 7 the display surface 11 presents a display including a blue background 13, red action delineations 14 in the form of a sun-burst, and the trade name Vibra-Lite formed in white. The action delineations 14 are in the form of straight lines representing sun rays, which appear to radiate from a pictorial representation of the sun. These action delineations have end portions which appear to be substantially in contact with the letters forming the coined word Vibra-Lite. As set forth in the foregoing specification, the display surface 11 is flooded with blue or green light and intermittently in rapidly recurring cycles with red light, so that the display surface background 13 is brilliantly illuminated with non-flickering effect and the action delineations 14 appear to pulsate or vibrate, in other words, shoot out from the pictorial representation of the sun. Due to the fact that the colour scheme of the name Vibra-Lite is neutral, and that the action delineations 14 appear to contact therewith, an illusion of movement of the action delineations behind Vibra-Lite is produced, whereby the said name appears to stand forward of said action delineations, and thus a third dimensional effect is produced.

In Fig. 8 the display surface 11 permits a modification of the effect obtained in the display portrayed in Fig. 1. The display background, designated by the reference character 13a is formed in shades of blue colour. The pictorial representations 15a include the boy and the wording "call for Philip Morris", and are formed in shades of colour contrastingly different to the background 13a and the action delineations 15a. Portions of the latter appear to be in contact with the pictorial representations 14a and appear to pass behind the letters forming the words "call for Philip Morris". Illumination of this display in the prescribed manner affords the appearance of motion of the action delineations 14a, which appear to reside in a plane rearward of the aforesaid pictorial representations, thus providing the illusion of third dimensional effect.

A further modification of the third dimensional effect is shown in Fig. 9, in which the background 13b comprises black and green portions or areas, and indicia objects 15b and 15c are arranged in spaced relation on the said background, with action delineations 14b arranged in the form of a multiplicity of lines extending in diverging relation substantially from object 15b to object 15c. The object 15c is in the form of a proper noun comprising block letters or, in other words, object representations having facial areas flanked by receding areas which appear to be substantially at right-angles to the said facial areas. The action delineations appear to reside in alignment with the receding areas of the said objects. When animated the action delineations 14b appear to pulsate and occupy a perpendicular plane intermediate the respective planes occupied by the object representations 15b and 15c. In this display, the action delineations when animated in the manner set forth appear to move towards the indicia figure 15c and have the effect of directing the attention of an observer to the said object, thus forming an exceptional appearance of dominance of the said object in the display.

Figure 10:

A still further modification of the third dimensional effect is illustrated in Fig. 10 which represents a panoramic scene. In this view the background 13c forms a pictorial representation of the sky and the aurora borealis is depicted by the action denoting lines 14c, the lower ends of which appear to be in contact with the scenic objects 15d constituting part of the said panoramic scene. In this figure the scenic objects 15d are preferably formed in shades of neutral colour against a non-neutral coloured background, or in other words, a pictorial representation of the sky, which is formed in contrastingly different shades of non-neutral colour. When illuminated in the manner hereinbefore set forth, the action denoting lines 14c appear to throb or pulsate, or expand and contract, and the illusion of animation of the sky background is produced. Movement of the action denoting lines 14c, which extend upwardly from the scenic objects 15d afford the illusion that the sky background resides in a perpendicular plane far in the rear of the scenic objects, and a very striking third dimensional illusion is effected.

Figure 11:
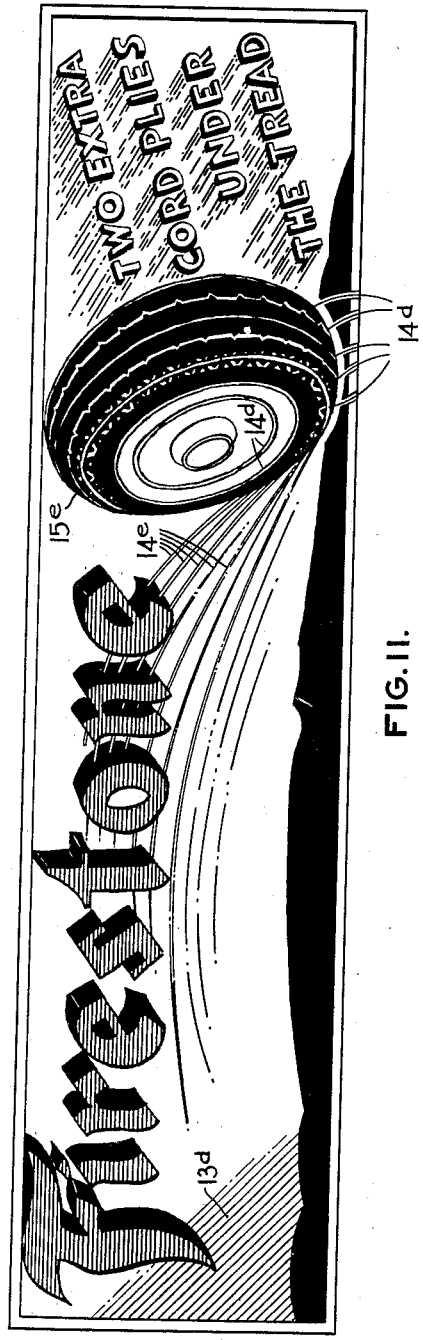

In Fig. 11 there is displayed a pictorial representation of a revolving object, designated by the reference character 15e on a background 13d. Action denoting lines 14d are formed in such manner that they appear to extend circumferentially about the said object and on surfaces thereof, and action denoting lines 14e are arranged substantially in tangential relation with respect to the external periphery of the said object. When this display is illuminated in the manner hereinbefore set forth, the action denoting lines 14d and 14e appear animated and afford the optical illusion of rapid revolving of the object 15e. The action denoting lines 14e when animated convey the impression to the eye that the object 15e is revolving forwardly of the said action denoting lines.

It will be readily understood that the form and proportion of the action denoting lines, or action delineations, depend entirely upon the subject matter of the display and may vary from very narrow lines, such as depicted on the object 15e shown in Fig. 11, to wide bands as shown in Figs. 8 and 9, or a combination of lines and broad areas as illustrated in Fig. 10. In each case where an appearance of vivid animation of action denoting lines, or action delineations, is desired, the whole or portions thereof must be in contacting relation with or appear to be in contacting relation with surface areas of contrastingly different non-neutral colour. Due to the small scale at which the accompanying drawings have of necessity been made, it was not practical to illustrate this characteristic symbolically. For similar reasons, symbolic cross-hatching has been limited to small areas of the displays contained in Figs. 10 and 11.

Where the background areas of the display or pictorial representations of objects cover considerable area and it is essential that such areas be illuminated with substantially non-flickering appearance, the apparatus illustrated in Figs. 1 to 6 inclusive is well adapted for this purpose. In such instances where a slight amount of background flicker is not objectionable, the type of colour filter and apparatus shown in Fig. 7 may be used and affords very vivid action denoting line animation effect. In certain cases it may be expedient to combine apparatus of the type shown in Fig. 7 with apparatus of the character illustrated in Figs. 1 to 6 inclusive, particularly where a portion of the display requiring vivid animation is to be featured.

We claim:

1. In the art of illuminated displays, a display surface embodying an indicia figure and a plurality of action denoting lines directed towards the said indicia figure, and background portions for the said indicia figure and the said action denoting lines; the said indicia figure being formed in shades of colour contrastingly different to the immediately adjoining background portions of the said display surface; the said action denoting lines being formed in shades of non-neutral colour bordered with background portions of contrastingly different shades of non-neutral colour; the said indicia figure and the said action denoting lines being formed and arranged as aforesaid so that when the said action denoting lines are illuminated in such manner that they appear to move rapidly, the said indicia figure appears to reside in a plane other than the plane in which the said action denoting lines appear to reside; and apparatus arranged to illuminate the said display surface to produce an optical illusion of rapid movement of the said action denoting lines, the said apparatus including means arranged to illuminate the said display surface with coloured light and means to intermittently flood the said action denoting lines with light including shades of colour corresponding substantially to shades of colour of the said action denoting lines.

2. In the art of illuminated displays, a display surface embodying an indicia figure and a plurality of action denoting lines, each of which groups includes a plurality of closely spaced action denoting lines having ends which appear to be in contact with the said indicia figure, and background portions for the said indicia figure and the said action denoting lines; the said indicia figure being formed in shades of colour contrastingly different to the immediately adjoining background portions of the said display surface; the said action denoting lines being formed in shades of non-neutral colour bordered with background portions of contrastingly different shades of non-neutral colour; the said indicia figure and the said action denoting lines being formed and arranged as aforesaid so that when the said action denoting lines are illuminated in such manner that they appear to move rapidly, the said indicia figure appears to reside in a plane other than the plane in which the said action denoting lines appear to reside; and apparatus arranged to illuminate the said display surface to produce an optical illusion of rapid movement of the said action denoting lines, the said apparatus including means arranged to illuminate the said display surface with coloured light and means to intermittently flood the said action denoting lines with light including shades of colour corresponding substantially to shades of colour of the said action denoting lines.

3. In the art of illuminated displays, a display surface embodying an indicia figure and a plurality of action denoting lines arranged in closely spaced relation and directed towards the said indicia figure so as to direct the eyes of an observer towards the said indicia figure, and background portions for the said indicia figure and the said action denoting lines; the said indicia figure being formed in shades of colour contrastingly different to the immediately adjoining background portions of the said display surface; the said action denoting lines being formed in shades of non-neutral colour; the said indicia figure and the said action denoting lines being formed and arranged as aforesaid so that when the said action denoting lines are illuminated in such manner that they appear to pulsate, the said indicia figure appears to reside in a plane other than the plane in which the said action denoting lines appear to reside; and apparatus arranged to illuminate the said display surface with cyclically varying beams of coloured light to produce an optical illusion of pulsation of the said action denoting lines.

4. Display apparatus of the character described including, in combination, a display embodying background and indicia portions, including an object representation and a plurality of action delineations arranged in the zone of the said object representation, the said action delineations being formed in shades of non-neutral colour with portions thereof bordered in contacting relation with coloured areas which are contrastingly different to the shades of colour of the said action delineations; and apparatus arranged to effect intermittent illumination of the said display with shades of coloured light analogous to the shades of colour of the said action delineations; the said object representation and the said action delineations being formed and arranged in such manner and the said apparatus being arranged to illuminate the said display with coloured light as aforesaid, in intermittent and rapidly recurring cycles, in such wise that the said object representation appears to remain stationary and, due to persistence of vision, the said action delineations appear to move to and fro and appear to reside in a perpendicular plane other than the plane in which the said object representation appears to reside.

5. Apparatus of the character described embodying a display including background and indicia portions constituting a pictorial representation of a panoramic scene, comprising background areas formed in shades of non-neutral colour and action denoting lines in contiguous relation with the said background, which action denoting lines are formed in shades of non-neutral colour contrastingly different to the colour scheme of the said background, and an object representation formed in shades of colour contrastingly different to the said background and action denoting lines, the said object representation being so formed and co-related with the said action denoting lines that ends of the latter appear to contact with the said object representation; and apparatus arranged to illuminate the said display to produce an optical illusion of movement of the said action denoting lines, said apparatus including means to flood the display with light of different colours including intermittent flooding of the display in rapid recurring cycles with light of a colour corresponding substantially to the colour of the said action denoting lines.

6. In the art of illuminated displays, a display surface embodying an indicia figure and a plurality of action denoting lines arranged with end portions thereof in close proximity to the said indicia figure, and background portions for the said indicia figure and the said action denoting lines; the said indicia figure being formed in shades of colour contrastingly different to the immediately adjoining background portions of the said display surface; the said action denoting lines being formed in shades of non-neutral colour bordered with background portions of contrastingly different shades of non-neutral colour; the said indicia figure and the said action denoting lines being formed and arranged as aforesaid so that when the said action denoting lines are illuminated in such manner that they appear to pulsate, the said indicia figure appears to reside in a plane forward of the plane in which the said action denoting lines appear to reside; and apparatus arranged to illuminate the said display surface to produce an optical illusion of movement of the said action denoting lines, the said apparatus including means to project a beam of coloured light onto the said display surface, and motivated means arranged to be intermittently interposed in the path of the light beam projected from the aforesaid means at a rate of speed within the speed range defined on the one hand by the minimum speed at which a continuously retained retinal impression of the colour of the said action denoting lines begins, and on the other hand at the speed at which persistency of vision becomes wholly effective, the said motivating means acting to intermittently exclude light of shades of colour analogous to the shades of colour of the said action denoting lines.

7. In the art of illuminated displays, a display surface embodying an indicia figure and a plurality of action denoting lines arranged with end portions thereof in close proximity to the said indicia figure, and background portions for the said indicia figure and the said action denoting lines; the said indicia figure being formed in shades of colour contrastingly different to the immediately adjoining background portions of the said display surface; the said action denoting lines being formed in non-neutral colour bordered with background portions of contrastingly different non-neutral colour; the said indicia figure and the said action denoting lines being formed and arranged as aforesaid so that when the said action denoting lines are illuminated in such manner that they appear to move rapidly, the said indicia figure appears to stand forward of the said action denoting lines; and apparatus arranged to illuminate the said display surface to produce an optical illusion of movement of the said action denoting lines, the said apparatus including means to project a beam of coloured light onto the said display surface, and motivated means arranged to be intermittently and rapidly interposed in the path of the light beam projected from the aforesaid means, the said motivating means acting to intermittently exclude light of shades of colour analogous to the shades of colour of the said action denoting lines.

8. In the art of illuminated displays, a display surface embodying an indicia figure and a plurality of action denoting lines arranged in close spaced relation and directed towards the said indicia figure so as to direct the eyes of a beholder towards the said indicia figure, and background portions for the said indicia figure and the said action denoting lines; the said indicia figure being formed in shades of colour contrastingly different to the immediately adjoining background portions of the said display surface; the said action denoting lines being formed in shades of non-neutral colour; the said indicia figure and the said action denoting lines being formed and arranged as aforesaid so that when the said action denoting lines are illuminated in such manner that they appear to move rapidly, the said indicia figure appears to reside in a plane other than the plane in which the said action denoting lines appear to reside; and apparatus arranged to illuminate the said display surface to produce an optical illusion of movement of the said action denoting lines, the said apparatus including means to project a beam of coloured light onto the said display surface, and motivated means arranged to be intermittently interposed in the path of the light beam projected from the aforesaid means, the said motivating means acting to intermittently exclude light of shades of colour analogous to the shades of colour of the said action denoting lines.

9. In combination, a display including background and indicia portions formed in contrastingly different shades of colour, including two object representations arranged in spaced relation on the said background, one of which object representations is larger than the other, and a plurality of closely spaced action denoting lines extending substantially from one of the said object representations to the other, the said action denoting lines being formed in diverging relation and being formed in shades of non-neutral colour on background areas of contrastingly different non-neutral colour; and apparatus arranged to illuminate the said display to produce an optical illusion of movement of the said action denoting lines whereby one of the said object representations appears to reside in a plane forward of the other said object representation; the said illuminating apparatus including means to flood the said display with coloured light, the said means including apparatus for effecting illumination of the said action denoting lines during intermittent periods with light of a colour substantially corresponding to the colour of the said action denoting lines, which intermittent periods of illumination recur at frequency such that the said action denoting lines appear to move to and fro.

10. In combination, a display including background and indicia portions, the indicia portions including an object representation having adjoining surface areas which appear to be formed in relative angular relation with one of the said surface areas constituting a frontal display surface and another of said surface areas appearing to constitute a flanking surface area, action denoting lines formed on the said background in close proximity to the said object representation flanking surface area and arranged substantially in parallelism therewith, the said action denoting lines being formed in shades of non-neutral colour and arranged on background portions formed in shades of non-neutral colour contrastingly different to the colour of the said action denoting lines; and apparatus arranged to illuminate the said display to produce an optical illusion of movement of the said action denoting lines and whereby the said object representation appears to be arranged forward of the said action denoting lines; the said illuminating apparatus including means to flood the said display with coloured light, the said means including apparatus for effecting illumination of the said action denoting lines during intermittent periods with light of a colour substantially corresponding to the colour of the said action denoting lines, which intermittent periods of illumination recur at frequency such that the said action denoting lines appear to move to and fro.

HENRY ARMSTRONG.
CLIFFORD N. DUNTON.